United States Patent
Pfau et al.

(10) Patent No.: US 8,529,127 B2
(45) Date of Patent: Sep. 10, 2013

(54) CONSTRUCTION AND MANUFACTURING METHOD FOR A SENSOR OF A THERMAL FLOW MEASURING DEVICE

(75) Inventors: Alex Pfau, Arlesheim (CH); Martin Barth, Basel (CH); Tobias Baur, Dornach (CH)

(73) Assignee: Endress + Hauser Flowtec AG, Reinach (CH)

( * ) Notice: Subject to any disclaimer, the term of this patent is extended or adjusted under 35 U.S.C. 154(b) by 579 days.

(21) Appl. No.: 12/805,904

(22) Filed: Aug. 24, 2010

(65) Prior Publication Data

US 2011/0041598 A1 Feb. 24, 2011

Related U.S. Application Data

(60) Provisional application No. 61/236,344, filed on Aug. 24, 2009.

(30) Foreign Application Priority Data

Aug. 24, 2009 (DE) .................. 10 2009 028 848

(51) Int. Cl.
*G01K 1/00* (2006.01)
*G01K 17/00* (2006.01)

(52) U.S. Cl.
USPC .......................... 374/208; 374/29; 73/204.22

(58) Field of Classification Search
USPC .................. 374/208, 29; 73/204.22
See application file for complete search history.

(56) References Cited

U.S. PATENT DOCUMENTS

| | | | | |
|---|---|---|---|---|
| 5,207,765 A * | 5/1993 | Eiermann et al. | .......... | 73/204.26 |
| 6,297,723 B1 * | 10/2001 | Shoji et al. | ....... | 338/28 |
| 6,796,172 B2 * | 9/2004 | Blakley et al. | ............ | 73/204.26 |
| 6,971,274 B2 | 12/2005 | Olin | | |
| 7,197,953 B2 * | 4/2007 | Olin | ............. | 73/866.5 |
| 7,640,798 B2 * | 1/2010 | Oda | .......... | 73/204.26 |
| 8,356,932 B2 * | 1/2013 | Pfau | .............. | 374/29 |
| 2013/0097858 A1 * | 4/2013 | Pfau | ................ | 29/854 |

FOREIGN PATENT DOCUMENTS

| | | |
|---|---|---|
| DE | 2 447 617 | 4/1976 |
| DE | 3 841 135 | 6/1990 |
| DE | 40 17 877 | 12/1991 |
| DE | 41 23 482 A1 | 2/1992 |
| DE | 103 61 564 | 7/2005 |
| FR | 1 238 716 | 4/1958 |
| GB | 1 503 872 | 3/1978 |
| GB | 94 06 603.5 | 9/1994 |

* cited by examiner

*Primary Examiner* — Lisa Caputo
*Assistant Examiner* — Jamel Williams
(74) *Attorney, Agent, or Firm* — Bacon & Thomas, PLLC

(57) ABSTRACT

Thermal flow measuring device and method for the manufacture of a thermal flow measuring device with a spacer having a first cavity for accommodating a resistance thermometer, wherein the spacer has at least a first planar area, which faces the first cavity, and a second cavity, through which the resistance thermometer can be pressed by means of a hold-down onto the first planar area of the spacer.

15 Claims, 1 Drawing Sheet

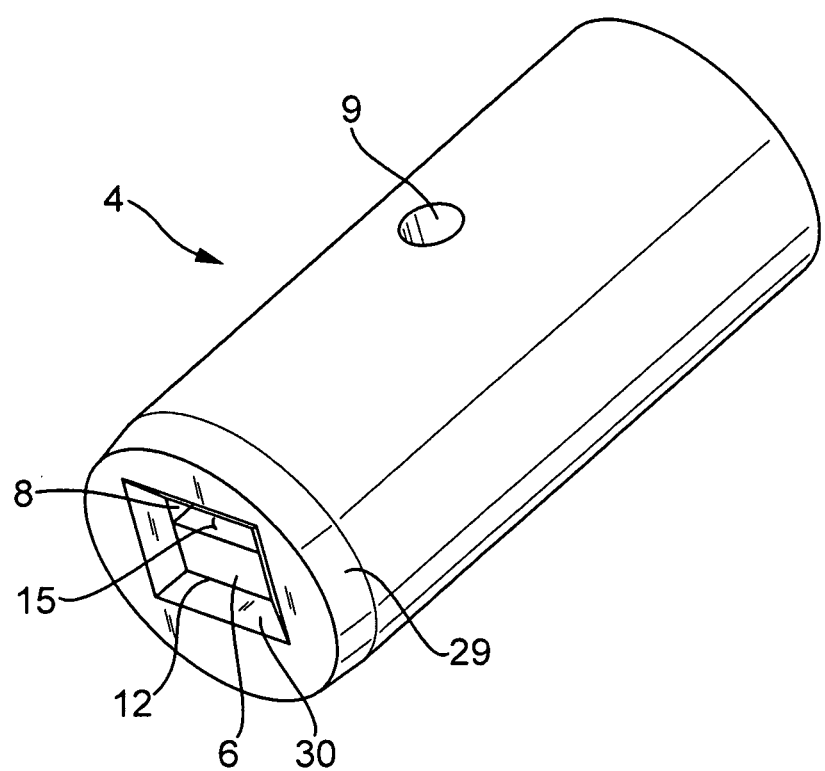

CONSTRUCTION AND MANUFACTURING METHOD FOR A SENSOR OF A THERMAL FLOW MEASURING DEVICE

CROSS-REFERENCE TO RELATED APPLICATION

This application is a Nonprovisional which claims the benefit of U.S. Provisional Application No. 61/236,344, filed on Aug. 24, 2009.

TECHNICAL FIELD

The present invention relates to a sensor for a thermal flow measuring device and to its manufacture.

BACKGROUND DISCUSSION

Conventional thermal flow measuring devices use usually two (embodied to be as similar as possible) temperature sensors, which are arranged in (most often pin-shaped) metal-shell housings—so-called stingers—and which are in thermal contact with the medium, which is flowing through a measuring tube or through the pipeline. For industrial application, the two temperature sensors are usually installed in a measuring tube; the temperature sensors can, however, also be directly mounted in the pipeline. One of the two temperature sensors is a so-called active temperature sensor, which is heated by means of a heating unit. For this heating unit, either an additional resistance heating is provided, or the temperature sensor itself is a resistance element, e.g. an RTD (Resistance Temperature Device) sensor, which is heated through conversion of an electrical power, for example, through a corresponding variation of the electrical measuring current. The second temperature sensor is a so-called passive temperature sensor: It measures the temperature of the medium.

In a thermal flow measuring device, the heatable temperature sensor is usually heated in such a way, that a fixed temperature difference is set between the two temperature sensors. Alternatively, it has also been known to supply a constant heating power via a control unit, which may utilize either open or closed loop control.

If there is no flow in the measuring tube, an amount of heat, which is constant in time, is then required for maintaining the predetermined temperature difference. If, in contrast, the medium to be measured is moving, the cooling of the heated temperature sensor is essentially dependent on the mass flow of the medium flowing past. Since the medium is colder than the heated temperature sensor, heat is transported away from the heated temperature sensor by the flowing medium. Thus, in the case of a flowing medium, in order to maintain the fixed temperature difference between the two temperature sensors, an increased heating power is required for the heated temperature sensor. The increased heating power is a measure for the mass flow of the medium through the pipeline.

If, in contrast, a constant heating power is fed in, the temperature difference between the two temperature sensors then decreases as a result of the flow of the medium. The particular temperature difference then serves as a measure for the mass flow of the medium through the pipeline (or through the measuring tube).

There is, thus, a functional relationship between the heating energy needed for heating the temperature sensor, and the mass flow through a pipeline or through a measuring tube. In thermal flow measuring devices, the dependence of the heat transfer coefficient on the mass flow of the medium through the measuring tube (or through the pipeline) is utilized for determining the mass flow. Devices which operate according to this principle are available from and sold by the assignee under the name "t-switch", "t-trend" or "t-mass".

Until now, primarily RTD-elements with helically wound platinum wires have been employed in thermal flow measuring devices. In the case of thin-film resistance thermometers (TFRTDs), a meander-shaped platinum layer is conventionally vapor deposited on a substrate. Over this, a glass layer is applied for protection of the platinum layer. The cross section of the thin-film resistance thermometers is rectangular, in contrast to the RTD-elements, which have a round cross section. Heat transfer into the resistance element and/or out of the resistance element accordingly occurs via two surfaces lying opposite each other, which, together, make up a large part of the total surface of a thin-film resistance thermometer.

In U.S. Pat. Nos. 6,971,274 and 7,197,953, installation of a cuboid-shaped thin-film resistance thermometer in a round pin-shaped housing is achieved in the following way. In a spacer socket (made of metal) with a rectangular recess, the thin-film resistance thermometer is applied in such a way, that at least the two large surfaces of the thin-film resistance thermometer (which lie opposite each other) have virtually gap-free contact with the surfaces of the spacer socket lying opposite them. To this effect, the spacer socket has a rectangular recess, which is manufactured according to the outer dimensions of the thin-film resistance thermometer. The spacer socket should hold the thin-film resistance thermometer tightly. In this regard, the spacer socket and the thin-film resistance thermometer virtually form a press fit. The spacer socket itself and the pin-shaped housing likewise form a press fit. In this way, use of a potting compound or some other fill material is made unnecessary. The advantage of this construction is that, due to the spacer socket, a good heat transfer exists between the thin-film resistance thermometer and the measured medium on all sides. However, due to the fixed seating of the thin-film resistance thermometer and/or through different coefficients of thermal expansion for the participant materials, mechanical stresses arise in the thin-film resistance thermometer.

SUMMARY OF THE INVENTION

An object of the invention is to provide a sensor for a thermal flow measuring device, wherein the sensor is simple to manufacture.

The object is achieved by a spacer for a sensor of a thermal flow measuring device; this spacer has a first cavity (especially a bore) for accommodating a resistance thermometer, wherein the spacer has at least a first planar area which faces the cavity, wherein the spacer has a second cavity, through which the resistance thermometer can be pressed by means of a hold-down onto the first planar area of the spacer. A resistance thermometer can thus be introduced into the spacer through the first cavity. This resistance thermometer is principally mounted on the first planar area of the spacer, wherein the first planar area faces toward the lumen of the first cavity. In such case, the resistance thermometer is, by means of a hold-down, pressed onto the first planar area or pressed against the first planar area. The hold-down is, in such case, led through a second cavity in the spacer (e.g. a bore), which, for example, lies opposite the first area.

In a first further development of the invention, the first cavity has, at least in certain regions, an essentially rectangular cross section. One of the four surfaces, which are defined by the cavity in the spacer, is then the first planar area of the spacer. A thin-film resistance thermometer can be applied onto this. If the first cavity is a blind bore, especially the region around the base of the bore can have a different cross section, since such is, for technical reasons, very difficult to manufacture.

Another further development of the spacer of the invention includes that at least the first cavity can be manufactured with a machining manufacturing method, e.g. through drilling or percussive drilling.

In an additional further development of the solution of the invention, the first cavity is a blind bore. Alternatively, the cavity traverses the entire length of the spacer, and thus corresponds to a traversing bore. The lengthwise extent of the first cavity is, in an example of an embodiment, essentially parallel to the longitudinal axis of the spacer.

A spacer of the invention has, for example, a cuboidal or cylindrical shape, and has, consequently, a longitudinal axis. If the first cavity is parallel to the longitudinal axis of the spacer (i.e. the longitudinal axis of the bore is parallel to the longitudinal axis of the spacer), the second cavity lies, for example, in an imaginary plane which is perpendicular to the first planar area of the spacer. The longitudinal axis of the second cavity then forms an angle with the longitudinal axis of the first cavity, which is greater than 30°, especially greater than 45°, and also especially greater than 60°. A pressing force is applied to the thin-film resistance thermometer by means of a hold-down, the hold-down being led through the second cavity. With an angle of a size greater than 75° between the longitudinal axes of the cavities, this force is easy to apply.

According to an additional further development of the invention, the second cavity—that is to say the longitudinal axis of the second cavity—is approximately perpendicular to the first planar area of the spacer.

Another further development of the spacer of the invention is based upon the idea that the spacer is a body which extends along a longitudinal axis, and which has a circularly shaped cross section; that the longitudinal axis of the first cavity runs approximately parallel to the longitudinal axis of the spacer, and that the first planar area of the spacer is a lateral surface of the first cavity. The cross section is the section through the spacer which is transverse to the longitudinal axis of the spacer, wherein the longitudinal axis runs in the lengthwise extension of the spacer.

Furthermore, the object underlying the invention is achieved by a thermal flow measuring device for determining and/or monitoring the flow of a measured medium through a measuring tube which has a first sensor and a second sensor; wherein the first sensor has a first shell housing (which is secured in a sensor holder) and a first resistance thermometer; and wherein the second sensor has a second shell housing (which is secured in the sensor holder) and a second resistance thermometer; wherein at least the first resistance thermometer is embodied in a manner that it can be heated; wherein the first resistance thermometer is at least partially inserted into the first cavity of a first spacer of the invention in the first housing, and that the second resistance thermometer is at least partially inserted into the first cavity of a second spacer of the invention in the second housing.

According to a first further development of the thermal flow measuring device of the invention, at least the first resistance thermometer is a thin-film resistance thermometer, which has a first surface, and a second surface which lies opposite the first surface; wherein the first surface of the first thin-film resistance thermometer is connected with the first planar area of the first spacer. The first surface of the first thin-film resistance thermometer is, thus, in thermal contact with the first planar area of the first spacer. The same can then also hold for the second sensor with its second housing, a second spacer of the invention, and a second thin-film resistance thermometer of the thermal flow measuring device. If a press fit exists between the spacer and the thin-film resistance thermometer inserted therein, stresses can then arise in the thin-film resistance thermometer, which can negatively influence measuring. If the distance between the walls of the spacer is too large, the heat conduction is poor. In the case of a very small distance, it becomes difficult to solder the thin-film resistance thermometer to a wall surface of the spacer, as the necessary pressure could not, up until now, be applied. Therefore, the second cavity is suitable for the leading through of a hold-down, with which the necessary pressure can be applied. The small distance between the thin-film resistance thermometer and the spacer wall on the side of the second surface of the thin-film resistance thermometer can then, for example, be filled with fill material.

In an additional further development, at least the first resistance thermometer—especially a thin-film resistance thermometer—is soldered onto the first planar area of the first spacer.

As presented in a further development of the thermal flow measuring device of the invention, at least the second surface of the first thin-film resistance thermometer is at least partially covered by (especially thermally conductive) fill material. If, in such case, the fill material is thermally conductive, it has available a thermal conductivity of at least 2 W/(mK). The fill material is composed of a powder or a potting compound—epoxy resin or silicone is, for example, used—and is filled into the first housing and into that area of the first cavity of the first spacer which is not occupied by the first thin-film resistance thermometer. If the second cavity is not already filled with another body, the second cavity is also filled with fill material.

Furthermore, the object underlying the invention is achieved by a method for manufacturing a sensor for a thermal flow measuring device of the invention, wherein a thin-film resistance thermometer, which has a first surface and a second surface which lies opposite the first surface, is at least partially inserted into the first cavity of a spacer of the invention, and the first surface of which is soldered onto the planar area of the spacer; wherein, at least during the soldering, a hold-down is led through the second cavity of the spacer, for pressing the thin-film resistance thermometer onto the first planar area of the spacer. A force on the second surface of the thin-film resistance thermometer in the direction of the planar area of the spacer is applied by the hold-down. The completely preassembled spacer can then be inserted into a shell housing.

In a first further development of the method of the invention, preformed solder portions are applied to the resistance thermometer and/or to the planar area of the spacer before inserting the resistance thermometer into the spacer.

In an additional further development of the invention, the housing has a first open end and a second open end, wherein the first open end can be secured in a sensor holder, and wherein cables for electrical contacting of the thin-film resistance thermometer extend out of the housing through the first open end of the housing, and wherein the spacer with the soldered-on thin-film resistance thermometer is inserted through the second open end of the housing, which is then sealed with a stopper.

In an additional further development of the solution of the invention, fill material (especially thermally conductive fill material) is filled into the housing and/or at least into the first cavity of the spacer, so that the fill material at least partially covers at least the second surface the of thin-film resistance thermometer. In another embodiment, the respective second cavities of the first and second spacers are, in each case, filled with fill material, or with a pin made of the same material. If the second cavity is not filled with a solid body (for instance, the second cavity is cylindrical, and a cylindrical pin, which forms a press fit with the second cavity, is inserted into the cavity), then the second cavity is filled with loose—or, during the assembly, flowable—fill material.

Another embodiment of the invention provides that thermally insulating fill material is filled into the housing, especially in such a way, that thermally insulating fill material is present between the first open end of the housing and the spacer. The fill material, also referred to as potting compound, is composed, for example, of a powdered form of a material with a low thermal conductivity, or of a heat insulating paste. Usually, an epoxy filling with a thermal conductivity of about 2 W/(mK) is used. Thus, for example, the housing can then be welded at its first end into the sensor holder, without damaging the solder connection of the spacer and resistance thermometer.

Another further development of the method of the invention provides that, before the introduction of the spacer with the thin-film resistance thermometer into the housing, the second cavity of the spacer is at least partially filled with a solid body, which is manufactured of the same material as the spacer.

BRIEF DESCRIPTION OF THE DRAWING

The invention will now be explained in greater detail on the basis of the appended drawing, the sole FIGURE of which shows as follows:

FIG. 1 is a spacer of the invention for inclusion in a sensor of a thermal flow measuring device.

DETAILED DESCRIPTION IN CONJUNCTION WITH THE DRAWING

FIG. 1 is a three-dimensional drawing of a spacer 4 of the invention. Spacer 4 is essentially cylindrical here, having a longitudinal axis (not shown) and a circularly shaped cross section transverse to the longitudinal axis. A first cavity 8 in the spacer 4 extends parallel to the longitudinal axis of the spacer 4, and has a rectangular cross section. The first cavity 8 here traverses the entire lengthwise extent of the spacer 4. Due to the rectangular cross section of the cavity 8, the spacer 4 has altogether four planar surfaces, which bound the cavity 8.

Inserted in the first cavity 8 is a thin-film resistance thermometer 6. The thin-film resistance thermometer 6 includes a first surface and a second surface 15 which lies opposite the first surface. The thin-film resistance thermometer 6 is soldered on its first surface onto the first planar area 12 of the spacer 4.

Extending perpendicular to this first planar area 12 is a second cavity 9 of the spacer; that is to say, a second bore 9 in the spacer 4 has a longitudinal bore axis perpendicular to the first planar area 12 of the spacer 4. During assembly, a hold-down, here in the form of a pin, is caused to extend through this second cavity 9. The hold-down contacts the thin-film resistance thermometer 6 on its second surface 15, and, with a force in the direction of the first planar area 12, presses it onto the first planar area 12, since, to solder on the thin-film resistance thermometer (TFRTD), a certain pressure on thermometer in the direction of the inner wall of the spacer is necessary. In such case, a solder layer is applied between first planar area 12 of the spacer 4 and first surface of the thin-film resistance thermometer 6, by means of which the thin-film resistance thermometer 6 is secured to the spacer 4, e.g. by means of induction soldering. After assembly, the hold-down can then be removed, and the second cavity 9 filled with a (here pin-shaped) solid body (which, for example, is produced from the same material as the spacer 4 itself). Alternatively, as in the case of the free space between the second surface 15 of the thin-film resistance thermometer 6 and the spacer 4, which can be filled with fill material, the second cavity 9 can likewise be filled with fill material. For reasons of perspicuity, a depiction of the fill material is omitted here.

If the spacer 4 is pushed into a housing in a case where there is a press fit between the spacer 4 and the housing, then the spacer 4 is chamfered to facilitate this. The spacer 4 has a first chamfer 29 on its end pointing toward the first end of the housing, when the spacer 4 is inserted into the housing through a second open end of the housing. Another chamfer 30 facilitates insertion of the thin-film resistance thermometer 6 into the first cavity 8.

The invention claimed is:

1. A spacer for a sensor of a thermal flow measuring device, having:
   hold-down means;
   a first cavity for accommodating a resistance thermometer;
   at least a first planar area which faces said first; and
   a second cavity, through which the resistance thermometer can be pressed by means of said hold-down onto said first planar area.

2. The spacer for a sensor of a thermal flow measuring device as claimed in claim 1, wherein:
   said first cavity has, at least in certain regions, an essentially rectangular cross section.

3. The spacer for a sensor of a thermal flow measuring device as claimed in claim 1, wherein:
   at least said first cavity can be manufactured with a machining manufacturing method.

4. The spacer for a sensor of a thermal flow measuring device as claimed in claim 1, wherein:
   said first cavity is a blind bore.

5. The spacer for a sensor of a thermal flow measuring device as claimed in claim 1, wherein:
   said second cavity is approximately perpendicular to said first planar area of the spacer.

6. The spacer for a sensor of a thermal flow measuring device as claimed in claim 1, wherein:
   the spacer is a body which extends along a longitudinal axis, and which has a circularly shaped cross section;
   the longitudinal axis of said first cavity is approximately parallel to the longitudinal axis of the spacer;
   said first planar area of the spacer is a lateral surface of said first cavity.

7. A thermal flow measuring device for determining and/or monitoring flow of a measured medium through a measuring tube, having:
   a first sensor; and
   a second sensor, said first sensor has a first housing secured in a sensor holder and a first resistance thermometer, and said second sensor has a second housing secured in the sensor holder and a second resistance thermometer, wherein:
   at least said first resistance thermometer is embodied in such a manner that it can be heated;
   said first resistance thermometer is at least partially inserted into a first cavity of a first spacer in said first housing, and said second resistance thermometer is at least partially inserted into a first cavity of a second spacer in said second housing; and the first spacer and the second spacer have:
hold-down means;
a first cavity for accommodating a resistance thermometer;
at least a first planar area which faces said first; and
a second cavity, through which the resistance thermometer can be pressed by means of said hold-down onto said first planar area.

8. The thermal flow measuring device as claimed in claim 7, wherein:
at least said first resistance thermometer is a thin-film resistance thermometer, which has a first surface and a second surface which lies opposite the first surface; and
said first surface of said first thin-film resistance thermometer is connected with said first planar area of the first spacer.

9. The thermal flow measuring device as claimed in claim 7, wherein:
at least said first resistance thermometer is soldered onto said first planar area of the first spacer.

10. The thermal flow measuring device as claimed in claim 7, wherein:
said second surface of said first thin-film resistance thermometer is at least partially covered by thermally conductive fill material.

11. A method for manufacture of a sensor of a thermal flow measuring device, comprising the steps of:
a thin-film resistance thermometer, which has a first surface and a second surface, which lies opposite the first surface, is at least partially inserted into the first cavity of a spacer;
is soldered with its first surface onto the first planar area of the spacer; and
at least during the soldering, a hold-down is led through the second cavity of the spacer for pressing the thin-film resistance thermometer onto the first planar area of the spacer.

12. The method for manufacture of a sensor for a thermal flow measuring device as claimed in claim 11, wherein:
preformed solder portions are applied onto the resistance thermometer and/or onto the first planar area of the spacer before introduction of the resistance thermometer into the spacer.

13. The method for manufacture of a sensor for a thermal flow measuring device as claimed in claim 11, wherein:
a housing is provided which has a first open end and a second open end;
the first open end can be secured in a sensor holder, and cables for electrical contacting of the thin-film resistance thermometer lead out of the housing through the first open end of the housing; and
the spacer with the soldered-on thin-film resistance thermometer is inserted through the second open end of the housing, which is then closed with a stopper.

14. The method for manufacture of a sensor for a thermal flow measuring device as claimed in claim 11, wherein:
thermally conductive and/or thermally insulating fill material is filled into the housing and/or at least into the first cavity of the spacer, so that the thermally conductive fill material at least partially covers the second surface of the thin-film resistance thermometer.

15. The method for manufacture of a sensor for a thermal flow measuring device as claimed in claim 11, wherein:
before introduction of the spacer with the thin-film resistance thermometer into the housing, the second cavity of the spacer is at least partially filled with a solid body, which is manufactured from same material as the spacer.

* * * * *